United States Patent
Chang

[11] Patent Number: 5,974,088
[45] Date of Patent: Oct. 26, 1999

[54] DIGITAL DATA SLICER

[75] Inventor: Andrew C. Chang, Hsin-Chu, Taiwan

[73] Assignee: United Microelectronics Corp., Hsin-Chu, Taiwan

[21] Appl. No.: 08/926,972

[22] Filed: Sep. 10, 1997

[30] Foreign Application Priority Data

Apr. 8, 1997 [TW] Taiwan ................................. 86205396

[51] Int. Cl.$^6$ .......................... H04B 14/04; H04B 14/06; H03M 7/46; H03M 7/30
[52] U.S. Cl. ........................ 375/244; 375/242; 341/63; 341/67; 341/76; 369/59; 340/146.2
[58] Field of Search ..................... 375/242, 244; 341/63, 67, 76; 369/59; 340/146.2

[56] References Cited

U.S. PATENT DOCUMENTS

| | | | |
|---|---|---|---|
| 4,348,659 | 9/1982 | Fujimori et al. | 341/58 |
| 4,501,000 | 2/1985 | Immink et al. | 375/242 |
| 5,166,958 | 11/1992 | Shimokoriyama et al. | 375/292 |
| 5,317,313 | 5/1994 | Kasser | 341/163 |
| 5,548,284 | 8/1996 | Hiramatsu | 341/68 |
| 5,673,243 | 9/1997 | Yanagi et al. | 369/59 |
| 5,831,951 | 11/1998 | Kamioka et al. | 369/48 |

*Primary Examiner*—Stephen Chin
*Assistant Examiner*—Michael W. Maddox
*Attorney, Agent, or Firm*—Rabin & Champagne, P.C.

[57] ABSTRACT

A digital data slicer which can allow the digital sum value (DSV) of the sliced signal to approach zero is provided. The digital data slicer includes a comparator for comparing the input signal with an analog reference slice level to thereby generate the sliced signal. A DSV calculator is used to obtain the DSV of the sliced signal. A DSV processor is used to compare the DSV with a predefined tolerance window to thereby generate a digital correcting signal. A digital-to-analog (D/A) converter is then used to convert the digital correcting signal into an analog form which either raises or lowers the reference slice level to the comparator. This feedback control goes on until the DSV is within the range defined by the tolerance window.

4 Claims, 3 Drawing Sheets

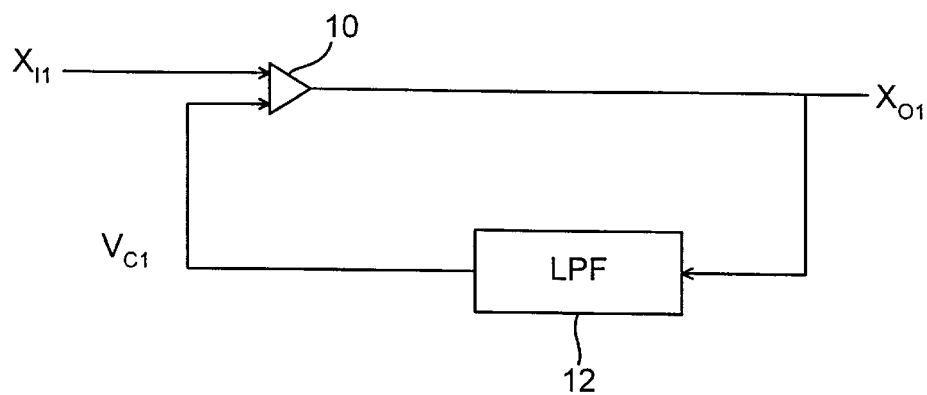
FIG. 1 - PRIOR ART
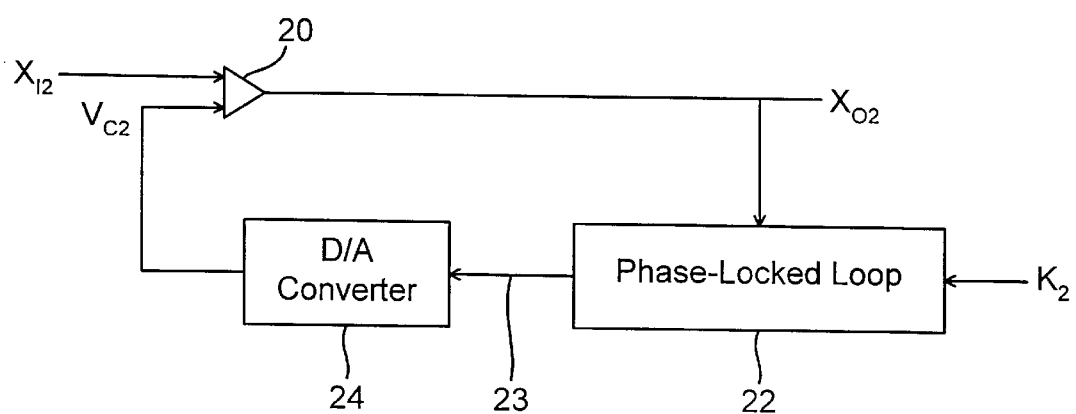
FIG. 2 - PRIOR ART

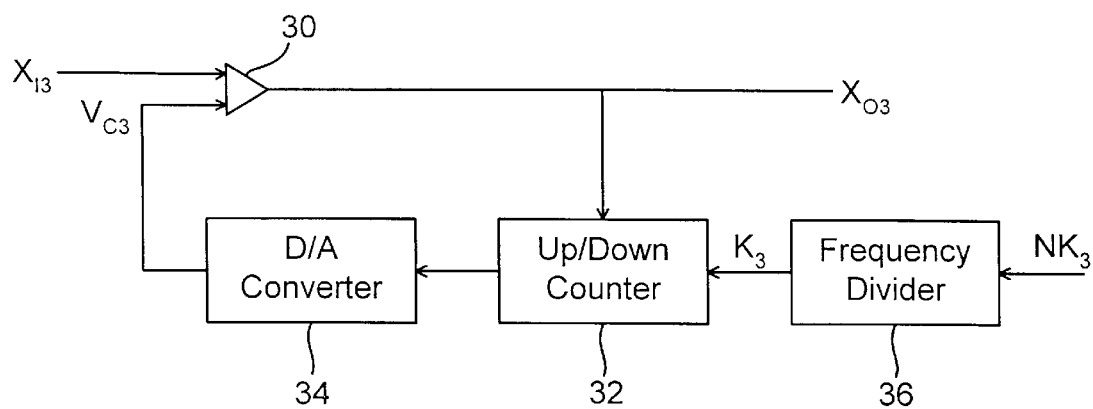
FIG. 3 - PRIOR ART
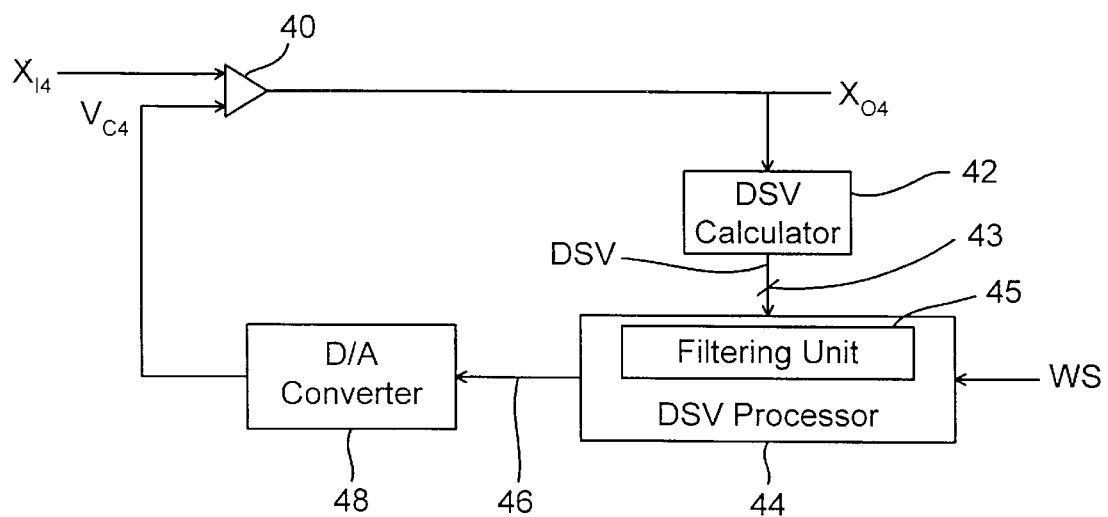
FIG. 4

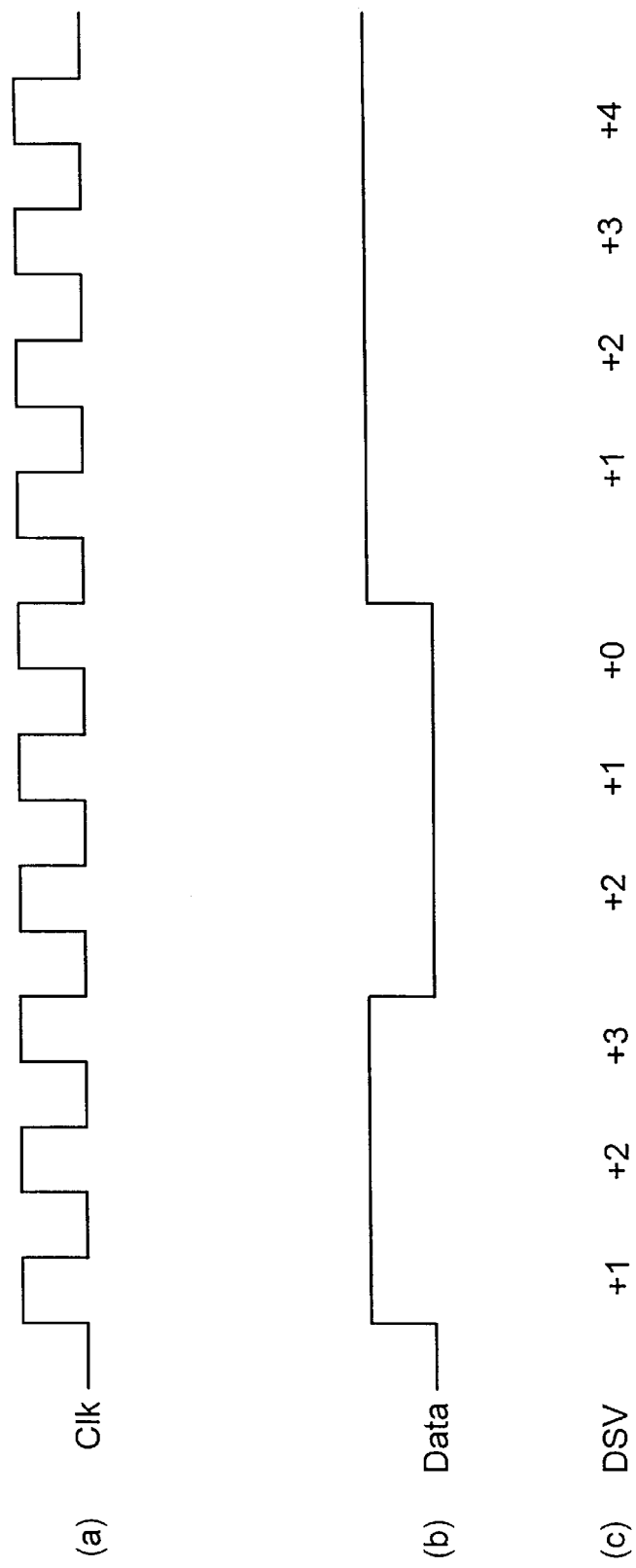

DIGITAL DATA SLICER

BACKGROUND OF THE INVENTION

1. Field of the Invention

This invention relates to digital data transmission systems, and more particularly, to a digital data transmission system of the type that might include a digital data slicer whose output sliced signal is based on feedback control using a digital sum value (DSV) of the output sliced signal.

2. Description of the Related Art

In digital data transmission systems, such as those used in transferring data within computers and over data networks, the appearance of a DC (direct current) component in the transmitted binary signal is highly undesirable. The DC component is the result of an unequal number of 1's and 0's in the transmitted binary signal. To minimize the DC component in the transmitted binary signal, a number of coding methods have been proposed which substitute symbols in the data stream with other symbols so that the number of 1's and 0's in the modified data stream is more nearly equal on a running basis. For instance, U.S. Pat. No. 4,833,471 discloses a coding method which can make the digital sum value (DSV) of the encoded binary data to approach zero before being transmitted. Additionally, the Red Book IEC-908 for CD-ROM data transmission specifies several standards that can make the DSV of encoded binary data approach zero.

Various conventional digital data slicers are available. Three conventional digital data slicers are illustrated and described in detail respectively in the following with reference to FIG. 1, FIG. 2, and FIG. 3. FIG. 1 is a schematic block diagram of a first conventional digital data slicer which includes a comparator 10 and a low-pass filter (LPF) 12. The comparator 10 has two input terminals: a first terminal receiving an input signal $X_{I1}$ and a second input terminal receiving a reference slice level $V_{C1}$. The reference slice level $V_{C1}$, is obtained by passing the output $X_{O1}$, of the comparator 10 through the LPF 12. The output $X_{O1}$, of the comparator 10 is referred to as a sliced signal and is the output of the digital data slicer. When the input signal $X_{I1}$ is greater than the reference slice level $V_{C1}$, the comparator 10 outputs a high voltage level representing a first binary logic value; when $X_{I1}$ is lower than $V_{C1}$, the comparator 10 outputs a low voltage level representing a second binary logic value.

FIG. 2 is a schematic block diagram of a second conventional digital slicer which also includes a comparator 20 having two input terminals: a first terminal receiving an input signal $X_{I2}$ and a second input terminal receiving a reference slice level $V_{C2}$. This digital data slicer differs from the previous one shown in FIG. 1 in that the reference slice level $V_{C2}$ is obtained by processing the output of the comparator 20, here designated by $X_{O2}$, through a phase-locked loop (PLL) 22 and a digital-to-analog (D/A) converter 24. The output $X_{O2}$ of the digital data slicer is once again the sliced signal. Under control of the clock signal $K_2$, the phase-locked circuit 22 converts the sliced signal $X_{O2}$ into a phase error 23. This phase error 23 is then converted by the D/A converter 24 into the reference slice level $V_{C2}$ which is provided to the comparator 20. When the input signal $X_{I2}$ is greater than the reference slice level $V_{C2}$, the comparator 20 outputs a high voltage level representing a first binary logic value; when $X_{I2}$ is lower than $V_{C2}$, the comparator 20 outputs a low voltage level representing a second binary logic value. In an alternate embodiment of the digital slicer of FIG. 2, the D/A converter 24 can be replaced by an integrator or a current source.

For the two conventional digital data slicers shown in FIGS. 1 and 2, if the data rate of the input signal is changed, the working bandwidth of the digital data slicers should be adjusted accordingly to provide optimal performance. If the digital data slicer is based on analog circuitry, the bandwidth adjustment is difficult to carry out and the selection of an appropriate bandwidth is limited because only a limited range of bandwidths are available for the adjustment. If the digital data slicer is based on digital circuitry, the hardware required to allow for adjustment of the bandwidth is costly to implement. In most practical applications, the accuracy of the output of the digital data slicer will be degraded when the bandwidth of the input signal varies from its nominal design range.

FIG. 3 is a schematic block diagram of a third conventional digital data slicer which is based on a comparator 30 having two input terminals: a first terminal receiving an input signal $X_{I3}$ and a second input terminal receiving a reference slice level $V_{C3}$. This digital data slicer differs from the previous two shown in FIGS. 1 and 2 in that the output of the comparator 30, here designated by $X_{O3}$, is processed by an up/down counter 32, a digital-to-analog (D/A) converter 34, and a frequency divider 36 to obtain the reference slice level $V_{C3}$. The sliced signal $X_{O3}$ is fed to the up/down counter 32 which is controlled by a clock signal $K_3$ output by the frequency divider 36. The clock signal $K_3$ is the output of the frequency divider 36 which divides an input clock signal $NK_3$ by a factor of N. The up/down counter 32 operates in such a manner that when the sliced signal $X_{O3}$ is at a first binary value (for example, 0) upon clock signal $K_3$ switching, the stored content of the up/down counter 32 is decreased by one. When the sliced signal $X_{O3}$ is at a second binary value (for example, 1) upon clock signal $K_3$ switching, the stored content of the up/down counter 32 is increased by one. The content of the up/down counter 32, which is a digital value, is output to the D/A converter 34 where the digital value is converted into an analog signal. The analog signal from the D/A converter 34 then serves as the reference slice level $V_{C3}$ provided as an input to the comparator 30. When the input signal $X_{I3}$ is greater than the reference slice level $V_{C3}$, the comparator 30 outputs a high voltage level represent a first binary logic value; when $X_{I3}$ is lower than $V_{C3}$, the comparator 20 outputs a low voltage level representing a second binary logic value.

In the digital data slicer of FIG. 3, the frequency divider 36 must be used to reduce the source frequency $NK_3$ to the frequency output $K_3$ because the D/A converter 34 has a limited bandwidth. One drawback to the use of the frequency divider is that it causes a delay and thus reduces the processing speed. Use of the frequency divider also reduces the accuracy of the digital data slicer.

SUMMARY OF THE INVENTION

It is therefore an objective of the present invention to provide a digital data slicer having digital control of bandwidth adjustment.

It is another objective of the present invention to provide a digital data slicer with improved bandwidth adjustment capabilities so that it can be used on high-frequency input signals.

It is still another objective of the present invention to provide a digital data slicer which can operate with increased performance.

It is yet another objective of the present invention to provide a digital data slicer which can be implemented with simplified hardware structure and thus reduced hardware cost.

In accordance with the foregoing and other objectives of the present invention, an improved digital data slicer is provided. Most preferably, a digital data slicer according to the invention includes the following constituent elements:

(a) a comparator for comparing the input signal with an analog reference slice level to generate a sliced signal;

(b) a DSV calculator, coupled to receive the sliced signal, for obtaining the DSV of the sliced signal;

(c) a DSV processor, coupled to the DSV calculator, for comparing the DSV with a predefined tolerance window to thereby generate a digital correcting signal; and (d) a digital-to-analog converter, coupled to the DSV processor, for converting the digital correcting signal into analog form, the analog output of the digital-to-analog converter being used as the reference slice level.

One advantage of preferred embodiments of the invention is that the digital data slicer is based on digital control technology. This allows the digital data slicer not to be restricted by the working bandwidth of the D/A converter so that the digital data slicer of the invention can be used on input signals of high transmission rate. Another advantage of the invention is that the setting of a tolerance window for the DSV processor allows the digital data slicer to obtain a suitable reference slice level that can speed up the response of the digital slicer.

BRIEF DESCRIPTION OF THE DRAWINGS

The invention can be more fully understood by reading the following detailed description of the preferred embodiments, with reference to the accompanying drawings, wherein:

FIG. 1 is a schematic block diagram of a first conventional digital data slicer which is based on an analog/digital low-pass filter;

FIG. 2 is a schematic block diagram of a second conventional digital data slicer which is based on a phase-locked loop;

FIG. 3 is a schematic block diagram of a third conventional digital data slicer which is based on an up/down counter;

FIG. 4 is a schematic block diagram of the digital data slicer according to the invention; and FIGS. 5(a)–(c) depict the principle of digital sum value (DSV).

DETAILED DESCRIPTION OF THE PREFERRED EMBODIMENTS

FIG. 4 is a schematic block diagram of a digital data slicer according to the invention which is devised in accordance with the principle of digital sum value (DSV). In accordance with this principle, the digital data slicer of the invention counts the number of 1's and 0's in an output binary data stream to produce a running sum DSV from the binary values of the transmitted bits. Thus, at the appearance of each clock pulse in the clock signal Clk (FIG. 5(a)), if the currently received binary data is at a first logic level, for example 1, the digital data slicer increases the DSV by one; while if the currently received binary data is at a second logic level, for example 0, the digital data slicer decreases the DSV by one. One example of the implementation of this principle is illustrated and described with reference to FIGS. 5(a)–(c). As shown in FIG. 5(b), the output binary data is at a logic-1 high level during the appearance of the first three clock pulses (FIG. 5(a)), at a logic-0 low level during the appearance of the next three clock pulses, and at a logic-1 high level during the appearance of the next four clock pulses. The binary data stream (FIG. 5(b)) is therefore [1, 1, 1, 0, 0, 0, 1, 1, 1, 1, . . .]. The DSV, shown in FIG. 5(c), correspondingly varies in the following sequence: [+1, +2, +3, +2, +1, 0, +1, +2, +3, +4, . . .]. The illustrated calculation of DSV using a binary counter is one of the most straight forward and most simply implemented, since the counter can have a shift register configuration, but other calculation techniques are, of course, possible.

As shown in FIG. 4, the digital data slicer of the invention preferably includes a comparator 40, a DSV calculator 42, a DSV processor 44, and a digital-to-analog (D/A) converter 48. The comparator 40 has two input terminals: a first input terminal receiving an input signal $X_{I4}$, and a second input terminal receiving a reference slice level $V_{C4}$. The comparator 40 has one output terminal, with the output of the comparator 40 being the sliced signal designated in FIG. 4 by $X_{O4}$. The reference slice level $V_{C4}$ is obtained by processing the sliced signal $X_{O4}$ through the DSV computing unit 42, the DSV processor 44, and the D/A converter 48. When the input signal $X_{I4}$ is greater than the (current) reference slice level $V_{C4}$, the comparator 40 outputs a high voltage level representing a first binary logic value. When $X_{I4}$ is lower than the (current) reference slice level $V_{C4}$, the comparator 40 outputs a low voltage level representing a second binary logic value. The DSV calculator 42 receives the sliced signal $X_{O4}$ as an input and then processes it in a manner such as that described earlier with reference to FIG. 5 to thereby obtain the current DSV of the output sliced signal $X_{O4}$ from the comparator 40. The output of the DSV counter 42 is then transferred via the data bus 43 to the DSV processor 44.

The DSV processor 44 has a predefined setting WS which specifies a tolerance window. Whenever the current value of DSV goes outside the tolerance window WS, it indicates that the reference slice level $V_{C4}$ should be corrected to bring the DSV back to within the tolerance window WS. For instance, if the current DSV is exceedingly high, beyond the range defined by the tolerance window WS, it indicates that the current reference slice level $V_{C4}$ is too low. In this case, the reference slice level $V_{C4}$ is adjusted to a higher level. The DSV processor 44 obtains the difference between the current DSV and the tolerance window WS to thereby generate a digital output representing a corrected value of the reference slice level $V_{C4}$. This corrected value is sent via the data bus 46 to the D/A converter 48 where it is converted into analog form. The reference slice level $V_{C4}$ is thus raised, reducing the DSV accordingly. This feedback control goes on until the DSV is lowered to within the range defined by the tolerance window WS. On the other hand, if the current DSV is exceedingly low, beyond the range defined by the tolerance window WS, it indicates that the current reference slice level $V_{C4}$ is too high. In this case, the reference slice level $V_{C4}$ should be lowered. The DSV processor 44 obtains the difference between the current DSV and the tolerance window WS to thereby generate a digital output representing a corrected value of the reference slice level $V_{C4}$. This corrected value is sent via the data bus 46 to the D/A converter 48 where it is converted into analog form. The reference slice level $V_{C4}$ is thus lowered, raising the DSV accordingly. This feedback control goes on until the DSV is raised to within the range defined by the tolerance window WS.

If required, the DSV processor 44 can further include a filtering unit 45 having a bandwidth corresponding to the working bandwidth of the D/A converter 48. This can minimize the aliasing in the output sliced signal and thus increase the accuracy of the sliced signal. Moreover, the DSV processor 44 can include various control means for monitoring the fluctuations of the DSV, as well as detection means for detecting the slope of the input signal or flaws in the input signal.

One advantage of preferred embodiments of the invention is that the digital data slicer uses digital controls. This allows the digital data slicer not to be restricted by the working bandwidth of the D/A converter 48 so that the digital data slicer of the invention can be used on input signals with high data transmission rates and the digital data slicer can be adjusted to accommodate different data transmission rates. Another advantage of the invention is that the setting of tolerance window for the DSV processor 44 allows the digital data slicer to obtain a suitable reference slice level that can speed up the response of the digital data slicer.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation as to encompass all such modifications and similar arrangements.

What is claimed:

1. A digital data slicer for transforming an input signal into a sliced signal, which comprises:

a comparator for comparing the input signal with an analog reference slice level to thereby generate the sliced signal;

a DSV calculator, coupled to receive the sliced signal, for obtaining the digital sum value (DSV) of the sliced signal;

a DSV processor, coupled to said DSV calculator, for comparing the DSV with a predefined tolerance window to generate a digital correcting signal; and a digital-to-analog converter, coupled to said DSV processor, for converting the digital correcting signal into analog form, an analog output of said digital-to-analog converter being used as the reference slice level by said comparator.

2. The digital data slicer of claim 1, wherein said DSV processor further includes a filtering unit having a bandwidth corresponding to the working bandwidth of said digital-to-analog converter.

3. The digital data slicer of claim 1, wherein said DSV processor further includes detection means for detecting the input signal.

4. The digital data slicer of claim 1, wherein said DSV calculator comprises a counter which is incremented when the input signal has a first binary value and is decremented when the input signal has a second binary value.

* * * * *